United States Patent [19]

Barraque et al.

[11] 4,349,442

[45] Sep. 14, 1982

[54] METHOD AND APPARATUS FOR TREATING WATER BY ION EXCHANGE

[75] Inventors: Christian Barraque, Sannois, France; Jayantilal D. Darji, Richmond, Va.

[73] Assignee: Degremont, Rueil-Malmaison, France

[21] Appl. No.: 251,944

[22] Filed: Apr. 7, 1981

[30] Foreign Application Priority Data

Apr. 17, 1980 [FR] France .............................. 80 08579

[51] Int. Cl.³ ............................................. B01D 15/04
[52] U.S. Cl. .................................... 210/675; 210/681; 210/686; 210/189; 210/269; 210/290
[58] Field of Search ............... 210/675, 681, 686, 189, 210/269, 274, 290

[56] References Cited

U.S. PATENT DOCUMENTS

| | | | |
|---|---|---|---|
| 3,385,787 | 5/1968 | Crits et al. | 210/686 |
| 3,394,079 | 7/1968 | Miller et al. | 210/675 |
| 3,475,330 | 10/1969 | Gilles | 210/681 |
| 3,575,294 | 4/1971 | Hirowatari et al. | 210/189 |
| 3,719,591 | 3/1973 | Crits | 210/675 |

Primary Examiner—Ivars C. Cintins
Attorney, Agent, or Firm—Wenderoth, Lind & Ponack

[57] ABSTRACT

A receptacle has therein a lower bed of mixed anionic and cationic ion exchange resins and an upper bed of cationic ion exchange resins. The upper bed rests directly on the lower bed without any mechanical separation therebetween. Regeneration of the upper bed is achieved by removing the upper bed from the receptacle without removal of the lower bed. An outlet is located adjacent the boundary between the upper and lower beds. Pressure is exerted on the upper surface of the upper bed, and simultaneously a thin substantially horizontal spray of water is directed along a horizontal plane which is adjacent the boundary, thereby directing the water spray and the cationic resins of the upper bed through the outlet. The cationic resins are regenerated and returned to the receptacle to reform the upper bed. Prior to return of the regenerated cationic ions, the lower bed is dried by draining water therefrom to prevent the returning cationic resins from mixing with the resins from the lower bed.

20 Claims, 3 Drawing Figures

METHOD AND APPARATUS FOR TREATING WATER BY ION EXCHANGE

BACKGROUND OF THE INVENTION

The present invention relates to a method and apparatus for treating water by ion exchange.

The present invention is particularly directed to such a method and apparatus for treating condensate in nuclear and thermal power stations. It is necessary that process for treatment of such condensate effectively remove all dissolved impurities, because the treated water must meet very strict purity requirements. In many instances the sodium and chloride concentrations in the treated condensate cannot be greater than 1.0 and 1.5 μg/l, respectively.

According to known technology, the treatment of such condensates is normally carried out in vessels containing an intimate mixture of cationic and anionic ion exchange resins, i.e., in a mixed resin bed, the purpose of which is twofold. Thus, corrosion and erosion products are formed in the steam cycle. These are generally oxides of metals and erosions inside the circuit of the station that shuttles vapor are eliminated by filtering in the mixed resin bed. Dissolved compounds are introduced by leakage of condenser cooling water, and these dissolved impurities are eliminated by ion exchange in the mixed bed.

Experience has shown that only treatment by mixed beds can produce satisfactory effluent when the condensate has been subjected to condenser leaks.

Such known technology is at a disadvantage however since the steam and the condensates contain ammonia, with the pH of the condensate maintained between 9.2 and 9.6.

The presence of ammonia in the condensate leads to gradual exhaustion of the cationic resin of the mixed bed and reduces its ability to remove dissolved sodium ions. As is well known, there is an absorption ratio which is favorable to cationic resins with respect to $NH_4$, that is preferentially absorbed through sodium. Thus, during processing of water containing ammonia and sodium ions, when ammonia absorption has reached a certain degree, sodium ions are freed by the resin, eluted by the ammonia. Therefore, the concentration of sodium ions in the effluent increases instead of diminishing.

Therefore, starting with the cationic resin being in balance with ammoniated condensate, $NH_4$-Na competition prevents removal of sodium ions, and it is no longer possible to ensure the effluent quality required by modern stations in the event of a leak, no matter how small, from the condensers. The concentration of sodium ions in the effluent exceeds acceptable limits, thereby requiring resin regeneration.

Such regeneration operations are lengthy and lead to significant consumption of the necessary regenerating reagents, e.g. sulfuric acid for regenerating cationic resins and sodium hydroxyde for regenerating anionic resins. One way to save the time required for the regeneration operations is to have a cationic resin bed precede the mixed bed. The cationic resin bed removes the ammonia from the condensate and prlongs the length of time of operation of the mixed resin bed. Thus, the cationic resin bed is regenerated each time it is saturated with ammonia, and the mixed bed exchanger remains operational until the anionic resin is exhausted.

In another known method, two beds of superimposed ion exchange resins are contained in the same vessel, the two beds being separated by a grid, and the two beds being separately regenerated. The separating mechanial grid is designed to maintain the lower bed in place during the extraction and replacement of the resin of the upper bed upon regeneration thereof. However, the use of the grid presents several disadvantages, the most significant of which is the need to provide a more complex overall installation which must be equipped not only with a grid, but also with components for evacuating the upper bed to allow for regeneration and rinsing. Additionally, the grid must be evenly supported.

Further, it does not appear that this prior method of separate beds has been used in the specific purification operation discussed herein.

SUMMARY OF THE INVENTION

With the above discussion in mind, it is the object of the present invention to provide a method and apparatus for treating water by ion exchange, whereby it is possible to overcome the prior art disadvantages.

It is specifically an object of the present invention to provide such a method and apparatus for treating condensed water which contains ammonia, such treatment being achieved by a single ion exchange operation in an exchanger containing several types of resins.

These objects are achieved in accordance with the present invention by the provision of a receptacle having therein a lower bed of mixed anionic and cationic ion exchange resins and an upper bed of cationic ion exchange resins. The upper bed rests directly on the lower bed without any mechanical separation therebetween. Water to be treated, for example condensate containing ammonia, is passed downwardly through first the upper bed and then the lower bed to form treated water which is then discharged from the receptacle. The upper bed removes the ammonia present in the condensate water to be treated, and the lower bed achieves the primary treatment, i.e. demineralization of the condensate.

Periodically, the normal treatment operation is interrupted and the two beds may be separately removed from the receptacle for regeneration, the upper bed being regenerated several times between regenerations of the lower bed. The upper bed is removed from the receptacle without removal of any of the resins of the lower bed and is transferred to a regeneration vessel separate from the receptacle. When regenerated, the resins of the upper bed are returned to the receptacle such that the upper bed is reformed on top of the lower bed.

Removal of the resins of the upper bed from the receptacle is achieved by providing an outlet located adjacent the boundary between the upper and lower beds and connected to the regeneration vessel. Pressure, for example by air or water, is exerted on the upper surface of the upper bed, and simultaneously a thin substantially horizontal spray of water is directed along a horizontal plane which is adjacent the boundary between the upper and lower beds and which covers substantially the entire horizontal cross-section of the upper bed. This water spray and the upper pressure thereby direct the water spray and the cationic resins of the upper bed through the outlet.

Before the regenerated cationic resins of the upper bed are returned to the receptacle for reformation of the upper bed, and to avoid mixing of the returning cationic resins with the resins of the lower bed, the lower bed is dried.

In accordance with the present invention, the provision of the mixed bed of mixed resins being preceded by a pretreatment bed consisting only of cationic resins ensures prior removal of ammonia from the water to be treated and hence a reduction of the pH thereof, prior to the water to be treated passing through the mixed bed. Also, the upper bed of cationic resins retains therein elements or particles suspended in the water to be treated, thus avoiding accumulation of such elements in the mixed bed.

The thickness of the bed is arranged so that it will not become saturated with ammonia before a predetermined length of operation, generally approximately 100 hours. The thickness of a particular cationic bed for a particular ion exchange apparatus may be determined empirically by methods known in the art.

Since the upper bed of cationic resins ensures prior partial purification of the water to be treated, to thereby lengthen the time between which the lower mixed bed needs to be regenerated, the upper bed of cationic resins will be regenerated several times between regenerations of the lower mixed bed.

The removal of the upper bed from the receptacle for regeneration of the upper bed is achieved by exerting pressure on the upper surface of the upper bed and by simultaneously directing a thin substantially horizontal spray of water along a horizontal plane which is adjacent the boundary between the upper and lower beds. The horizontal spray of water is formed by a plurality of nozzles located at the horizontal plane which is located at the boundary between the upper and lower beds or immediately above such boundary. The individual water sprays from all of the nozzles cooperate or combine to form a flat water spray which covers substantially the entire cross-section of the upper bed. Each nozzle has a nozzle opening dimensioned to form a flat individual water spray having a horizontal spray angle of from 90° to 120°. Each nozzle opening has a height of from 5 mm to 10 mm and a horizontal width of from 12 mm to 25 mm.

The positioning of the nozzles will depend upon the location of the extraction outlet nozzle for leading the resins of the upper cationic bed out of the receptacle. Such outlet may be an opening at the inner wall of the receptacle, or alternatively may be a tube having an opening which opens upwardly at the boundary between the upper and lower beds at a position in the center of the receptacle. In either case, the opening is located either at or immediately above the boundary between the upper and lower beds. The nozzles are located at positions such that a maximum horizontal cross-section is swept by the water spray produced by the plurality of nozzles.

To achieve drying of the lower bed before returning regenerated cationic resins from the regeneration vessel to reform the upper bed, water is drained downwardly from the lower bed by a sufficient amount such that the top of the lower bed will not be subjected to mixing or erosion upon introduction thereover of the regenerated resins to reform the upper bed. This may be achieved by suitably draining downwardly water from the lower bed until approximately the upper half of the lower bed is dry. Mixed resin beds of otherwise known type, when drained in this manner, will have sufficient rigidity to resist any agitating force produced by reintroducing the cationic resins to reform the upper bed.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 1:
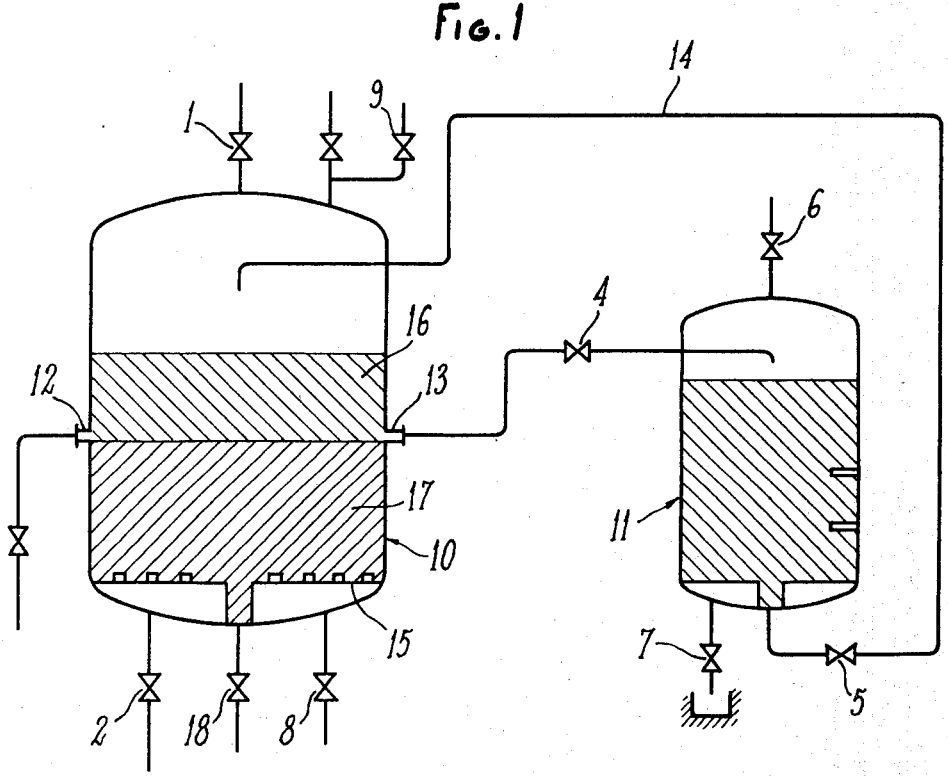
FIG. 1 is a schematic view illustrating an apparatus according to the present invention.

The following discussion will refer to treatment of water having therein minerals and ammonia, with particular reference to such water being a condensate formed in a nuclear or thermal power station. It is to be understood however that the scope of the present invention is not intended to be limited to the treatment of such specific water to be treated, but is rather intended to encompass the treatment of a wide variety of contaminated waters.

With reference now to the drawings, there is shown an ion exchange receptacle 10 having therein a lower bed 17 of mixed anionic and cationic ion exchange resins and an upper bed 16 of solely cationic ion exchange resins. The upper bed 16 rests directly on lower bed 17 without the interposition therebetween of any mechanical separation devices or grids. The lower bed 17 rests on a conventional plate 15 which is equipped with nozzles of the type normally employed for such systems.

The thickness of the upper bed or layer 16 will be determined for a particular installation based upon the concentration of ammonia in the condensate or water to be treated. It is contemplated that the upper bed 16 will not become saturated in less than 100 hours of operation. It will be understood that the determination of the thickness of bed 16, i.e. the required mass of resins thereof can be determined empirically from prior tests in a manner which will be understood by those skilled in the art.

A normal water treatment operation is conducted by introducing water to be treated through valve 1 and passing it downwardly first through upper bed 16 and then through lower bed 17 to form treated water which is removed from the receptacle 10 via a valve 2. The upper bed 16 of cationic resins removes ammonia from the water to be treated, such that the lower bed 17 will not become saturated with the ammonia. The upper bed 16 also filters out any particles or elements which may be in the water to be treated, thereby preventing clogging of lower bed 17. The lower bed 17 achieves demineralization of the water to be treated, for example by removing sodium and chloride ions, in a known manner.

It periodically becomes necessary to interrupt the water treatment operation and to conduct regeneration of the resins. Specifically, it is contemplated that the upper bed 16 will be regenerated several times between regenerations of lower bed 17.

Regeneration of upper bed 16 is achieved by removing upper bed 16 from receptacle 10, via outlet 13 and valve 4, and introducing the cationic resins of upper bed 16 into a regeneration vessel 11, within which regeneration of the cationic resins is achieved. The thus regenerated cationic resins are returned via a valve 5 and line 14 to receptacle 10 in a manner to achieve reformation of the upper bed 16.

Thus, when it is desired to transfer upper bed 16 from receptacle 10 to vessel 11, valves 1 and 2 are closed, thereby interrupting the normal water treatment operation. Then, pressure is exerted on the upper surface of upper bed 16. This is achieved by, for example, supplying air under pressure through valve 9, or alternatively supplying water under pressure through the valve parallel to valve 9. Simultaneous with the application of such pressure, there is directed a thin substantially horizontal spray of water along a horizontal plane which is adjacent the boundary between the upper and lower beds and which covers substantially the entire horizontal cross-section of the upper bed. This water spray thereby directs the cationic resins of the upper bed 16 through outlet 13 which is located adjacent the boundary between the upper and lower beds.

Figure 2:
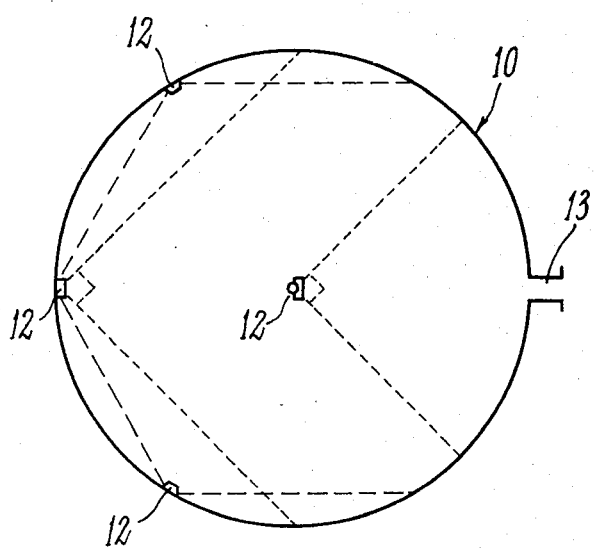
FIG. 2 is a generally horizontal schematic section illustrating the location of evacuation nozzles and the angles of sprays produced thereby according to one embodiment of the present invention.
Figure 3:
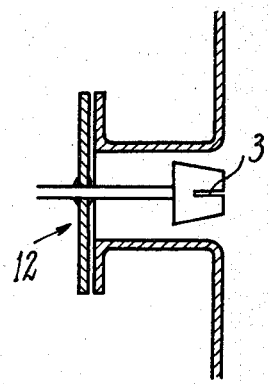
FIG. 3 is an enlarged section illustrating the configuration of one of the nozzles of the present invention.

In a preferred embodiment of the present invention, as illustrated in FIG. 2, there are provided a plurality of water spray nozzles 12 located at the horizontal plane. That is, nozzles 12 are located at the boundary between the upper and lower beds or immediately above such boundary. The outlet 13 is an opening at the inner wall of receptacle 10. The plurality of nozzles include first and second nozzles located at the inner wall of receptacle 10. Specifically, the first and second nozzles 12 are each circumferentially spaced around the inner periphery of vessel 10 from the opening 13 by a circumferential distance equal to $2\pi R/3$, wherein R is the inner radius of receptacle 10. That is, the first and second nozzles 12 are circumferentially spaced from opening 13 by $\frac{1}{3}$ of the circumference of the receptacle 10. The first and second nozzles 12 are also circumferentially spaced from each other by a distance of $\frac{1}{3}$ of the circumference of receptacle 10. As illustrated in FIG. 2, each of the first and second nozzles 12, i.e. the uppermost and lowermost nozzles illustrated in FIG. 2, form flat individual water sprays each having a horizontal spray angle of approximately 120°. The bisector of the spray angle of each of the first and second nozzles 12 passes through the central axis of the receptacle 10. The plurality of nozzles also include a third nozzle located at the central axis of the receptacle 10 and forming a flat individual water spray having a horizontal spray angle of approximately 90°. Also provided is a fourth nozzle 12 positioned at the inner wall of the receptacle 10 at a location midway between the first and second nozzles 12. The fourth nozzle forms a flat individual water spray having a horizontal spray angle of approximately 90°. The third and fourth nozzles 12 are positioned on a straight line passing through the opening 13 and also through the central axis of receptacle 10. This straight line bisects the horizontal spray angles of the third and fourth nozzles. By this arrangement, the horizontal cross-section of the interior of the receptacle 10 covered by the water spray formed by the combination of the individual water sprays of the nozzles amounts to 90.7% of the area of the interior of the receptacle.

It is to be understood, however, that the scope of the present invention is not intended to be limited to the specific positioning of the nozzles 12 and the opening 13 illustrated in FIG. 2. Rather, any other arrangement providing relative positioning of nozzles 12 and opening 13 which achieves the obvious function discussed herein is encompassed within the scope of the present invention. One such alternative arrangement would be to provide the tube associated with valve 4 to extend inwardly into the interior of receptacle 10 and to have an opening 13 which opens upwardly at the boundary between the upper and lower beds at a position in the axial center of the receptacle 10. Such tube could extend into the interior of receptacle 10 at any convenient location, such as upwardly through the bottom center thereof. In such arrangement, the plurality of nozzles would be equally spaced around the inner wall of the receptacle 10 at positions located at or immediately above the boundary. In one preferred arrangement according to this modification, there would be provided four nozzles spaced equally around the inner wall of the vessel 10, each nozzle forming a flat individual water spray having a horizontal spray angle of approximately 90°. This arrangement would provide a combined water spray covering 95.6% of the cross-sectional area of the interior of the receptacle.

The pressure which is exerted on the top of the upper bed 16, at the time of extraction or removal thereof, either by pressurized water or air, is such that it forms a flow of 5 to 8 $m^3/m^2/h$, while the nozzles 12 are supplied with water in such a way as to jointly create a flow of 2 to 4 $m^3/m^2/h$.

By the above manner of transfer of the cationic resins of upper bed 16 from receptacle 10 to vessel 11, there is not achieved any removal or transfer of the mixed resins of lower bed 17.

Within regeneration vessel 11, the cationic resins from upper bed 16 are regenerated, for example by introducing regeneration acid, such as sulfuric acid, through valve 6, the effluent being evacuated through valve 7. The regenerated cationic resins are rinsed and are then reintroduced into receptacle 10 via pipe 14. Specifically, valve 5 may be opened and water or compressed air may be injected through valve 6 to achieve transfer of the regenerated cationic resins.

When returning the regenerated cationic resins to receptacle 10 to reform therein the upper bed 16, it is recommended to avoid mixing of the returning cationic resins with the mixed resins from the bed 17. To achieve this end, in accordance with the present invention, the lower bed 17, or at least the upper portion thereof, is dried after the upper bed 16 has been removed from receptacle 10. This may specifically be achieved by downwardly draining water from lower bed 17 through valve 8, with opening air valve 9. At least the upper portion, for example the upper half, of lower bed 17 is thus dried. Resins of the type employed in this technology, when so drained, will present a surface which is sufficiently rigid to resist the potential agitating force of the reintroduced cationic resins.

After this drying of at least the upper portion of the lower bed 17, the regenerated and rinsed cationic resins from vessel 11 are reintroduced into the receptacle 10 through pipe 14, upon opening of valve 5, while still maintaining drainage valve 8 open during at least an initial portion of the total period of time necessary for reforming of the upper bed. Maintaining valve 8 open to continue draining during at least a portion of the period of time during which the regenerated cationic resins are returned to vessel 10 prevents the cationic resins from eroding the upper surface of the lower bed and unleashing or forming a mixture of the two beds. Preferably, drainage through valve 8 is maintained for approximately $\frac{2}{3}$ of the overall time required for transferring the regenerated cationic resins from vessel 11 to receptacle 10. The valve 8 is then shut, such that water will accumulate inside the receptacle 10 thereby causing inherent leveling of the upper bed 16. Once all of the resins of the upper bed 16 are returned to receptacle 10, the apparatus can be restored to its normal water treatment operation by opening valve 1 and 2.

It of course will eventually be necessary to regenerate lower mixed bed 17, and this can be achieved as follows. Initially, the upper bed 16 of cationic resins is removed from the receptacle 10 in the manner described above. Then, lower bed 17 is removed from receptacle 10, for example, through valve 18, and is then transferred to a known regeneration facility (not shown) whereat regeneration occurs.

The present invention offers the advantage of allowing treatment of condensates including not only minerals but also ammonia within a single receptacle, with the possibility of varying the time intervals between the regeneration phases of the separate resin beds in relation to the amount of ammonia in the condensate.

Therefore, there is achieved a flexible treatment procedure which may be easily adjusted to the particular quality of a particular condensate or water to be treated. Treatment according to the invention may be achieved with flow rates of the water to be treated of from 60 to 150 m$^3$/m$^2$/h. Moreover, material or particles in suspension in the condensate become concentrated at the upper resin bed or layer, from which they are removed by rinsing during regeneration, without choking up or clogging the lower mixed resin bed.

The invention will be further understood from a consideration of the following non-restrictive example.

EXAMPLE

A nuclear power station includes a pressurized water reactor of 900 MW capacity. Condensate flows in such station at a rate of 4200 m$^3$/h. The characteristics of the condensate are as follows:

pH = 9.2
Fe = 30 $\mu$g/l
Cu = 10 $\mu$g/l
SiO$_2$ = 20 $\mu$g/l
Na = 10 $\mu$g/l

After processing, the treated water will be recycled to the steam generator of the station, and it must meet the following criteria: Na < 1 $\mu$g/l; SiO$_2$ < 10 $\mu$g/l; Fe < 10 $\mu$g/l and Cu < 3 $\mu$g/l.

The condensation water to be treated is directed to five ion exchange facilities operating in parallel at 840 m$^3$/h per facility. Each facility includes a cylindrical exchanger 10 with a diameter of 3.20 m and an overall height of 3.60 m. The overall height of the combined resin bed is 1.80 m, and the water to be treated passes therethrough at a speed of 100 m$^3$/m$^2$/h.

Each receptacle is equipped with an assembly of nozzles 12 and an evacuation outlet 13 is illustrated in FIG. 2 and including two nozzles each having a horizontal spray angle of 120° and arranged on the inner wall of the receptacle 10 at a distance from each other and from the opening 13 equal to $\frac{2}{3}$ the circumference of the receptacle. Additionally, two nozzles are provided, each having a horizontal spray angle of 90°, one positioned at the axial center of the receptacle, and the other positioned at the inner wall of the receptacle at a position midway between the first two mentioned nozzles. The nozzles are all located in a horizontal plane positioned approximately 1 cm above the boundary between the two resin beds. Each nozzle has a horizontally extending slit having a horizontal width of 15 mm and a vertical height of 8 mm.

The resins within the receptacle are formed in a lower bed having a height of 90 cm and formed of 2400 l of cationic resins and 4800 l of anionic resins. Positioned directly on this lower bed is an upper bed of cationic resins. The upper bed may have a height as determined by the ammonia content, i.e. ph, of the water to be treated. The upper layer may be 45 cm high, or when the pH equals 9.4, the upper layer may be 90 cm thick to obtain an operational cycle of approximately 100 hours before saturation by ammonia of the upper bed.

By carrying out regeneration of the upper bed of cationic resins approximately every 100 hours, the length of time between regeneration of the lower bed is greater than 30 days. In spite of the fact that the resins of the lower bed are not yet saturated after this length of time, it is necessary to regenerate the lower bed for hydraulic reasons, for example increase of load loss by choking of the resins, and establishment of preferential paths through the lower bed.

The treated water discharged from such facility meets the above listed criteria.

It is to be understood that the present invention is not intended to be limited to the treatment of any specific type of contaminated water. Furthermore, it is to be understood that the present invention is not directed to the particular resins themselves. Thus, the resins for forming layers or beds 16 and 17 may be any resins which are known by those in the art for similar purposes.

Although the present invention has been described and illustrated with regard to a preferred embodiment thereof, it is to be understood that various modifications may be made thereto without departing from the scope of the present invention.

We claim:
1. A method for treating water by ion exchange, said method comprising:
providing within a receptacle a lower bed of mixed anionic and cationic ion exchange resins and an upper bed of cationic ion exchange resins, with said upper bed resting directly on said lower bed without any mechanical separation therebetween;
conducting a water treatment operation by passing water to be treated downwardly through first said upper bed and then said lower bed to thus form treated water, and the discharging said treated water from said receptacle; and
periodically interrupting said water treatment operation and conducting a regeneration operation comprising:
removing said upper bed from said receptacle without removal of said lower bed by exerting pressure on the upper surface of said upper bed, while simultaneously directing a thin substantially horizontal spray of water along a horizontal plane which is adjacent the boundary between said upper and lower beds and which covers substantially the entire horizontal cross-section of said upper bed, and thereby directing said water spray and said cationic resins of said upper bed to an outlet which is located adjacent said boundary;
passing said cationic resins of said upper bed from said outlet to a regeneration vessel and therein regenerating said cationic resins;

introducing regenerated cationic resins into said receptacle to reform said upper bed; and prior to introducing said regenerated cationic resins into said receptacle, drying said lower bed, to thereby prevent the returning cationic resins from mixing with the resins of said lower bed.

2. A method as claimed in claim 1, wherein said water to be treated contains ammonia and minerals, and said water treatment operation comprises substantially removing said ammonia in said upper bed, and then substantially removing said minerals in said lower bed.

3. A method as claimed in claim 1, wherein said drying said lower bed comprises downwardly draining water from said lower bed.

4. A method as claimed in claim 3, comprising continuing said draining during at least an initial portion of the period of time during which said regenerated cationic resins are returned to said receptacle.

5. A method as claimed in claim 1, further comprising, while said cationic resins of said upper bed are removed from said receptacle, removing said lower bed from said receptacle, regenerating said anionic and cationic resins of said lower bed, and returning anionic and cationic resins to said receptacle to reform said lower bed.

6. A method as claimed in claim 1, comprising removing said cationic resins of said upper bed from said receptacle through said outlet at a position adjacent the periphery of said receptacle.

7. A method as claimed in claim 1, comprising removing said cationic resins of said upper bed from said receptacle through said outlet at a position adjacent the center of said receptacle.

8. An apparatus for treating water by ion exchange, said apparatus comprising:

a receptacle having therein a lower bed of mixed anionic and cationic ion exchange resins and an upper bed of cationic ion exchange resins, said upper bed resting directly on said lower bed without any mechanical separation therebetween;

means for passing water to be treated downwardly through first said upper bed and then said lower bed to thus form treated water;

means for discharging said treated water from said receptacle;

a regeneration vessel, separate from said receptacle, for periodically regenerating said cationic resins of said upper bed;

means for removing said upper bed from said receptacle without removal of said lower bed and for transferring said cationic resins of said upper bed to said regeneration vessel, said removing and transferring means comprising an outlet located adjacent the boundary between said upper and lower beds and connected to said regeneration vessel, means for exerting pressure on the upper surface of said upper bed, and means for simultaneously directing a thin substantially horizontal spray of water along a horizontal plane which is adjacent said boundary and which covers substantially the entire horizontal cross-section of said upper bed, and for thereby directing said water spray and said cationic resins of said upper bed through said outlet;

means for introducing regenerated cationic resins into said receptacle to reform said bed; and means for drying said lower bed and for thereby preventing the returning cationic resins from mixing with the resins of said lower bed.

9. An apparatus as claimed in claim 8, wherein said drying means comprises means for downwardly draining water from said lower bed.

10. An apparatus as claimed in claim 8, further comprising means for removing said lower bed from said receptacle.

11. An apparatus as claimed in claim 8, wherein said pressure exerting means comprises means for subjecting said upper surface of said upper bed to water or gas under pressure.

12. An apparatus as claimed in claim 8, wherein said water spray directing means comprises a plurality of water spray nozzles located at said horizontal plane.

13. An apparatus as claimed in claim 12, wherein said nozzles and said horizontal plane are located at said boundary.

14. An apparatus as claimed in claim 12, wherein said nozzles and said horizontal plane are positioned immediately above said boundary.

15. An apparatus as claimed in claim 12, wherein each said nozzle has a nozzle opening dimensioned to form a flat individual water spray having a horizontal spray angle of from 90° to 120°, the said individual water sprays of all of said nozzles cooperating to form said water spray which covers substantially the entire cross-section of said upper bed.

16. An apparatus as claimed in claim 15, wherein each said nozzle opening has a height of from 5 mm to 10 mm and a horizontal width of from 12 mm to 25 mm.

17. An apparatus as claimed in claim 15, wherein said outlet comprises an opening at the inner wall of said receptacle, and said plurality of nozzles includes first and second nozzles located at said inner wall of said receptacle, said first and second nozzles each being spaced from said opening by one-third the inner circumference of said receptacle, said first and second nozzles being spaced from each other by one-third said inner circumference, said plurality of nozzles further including a third nozzle located at said inner wall of said receptacle midway between said first and second nozzles, and a fourth nozzle located in the center of said receptacle.

18. An apparatus as claimed in claim 17, wherein the said spray angle of each of said first and second nozzles is approximately 120°, and the said spray angle of each of said third and fourth nozzles is approximately 90°.

19. An apparatus as claimed in claim 15, wherein said outlet comprises an opening which opens upwardly at said boundary at a position in the center of said receptacle, and said plurality of nozzles are located at the inner wall of said receptacle at positions equally spaced around the circumference thereof.

20. An apparatus as claimed in claim 19, comprising four said nozzles, the said spray angle of each said nozzle being approximately 90°.

* * * * *